United States Patent [19]

Zukausky

[11] Patent Number: 4,534,537

[45] Date of Patent: * Aug. 13, 1985

[54] PILOT OPERATED VALVE ASSEMBLY

[75] Inventor: Keith E. Zukausky, St. Charles, Ill.

[73] Assignee: Eaton Corporation, Cleveland, Ohio

[ * ] Notice: The portion of the term of this patent subsequent to Jun. 14, 2000 has been disclaimed.

[21] Appl. No.: 504,258

[22] Filed: Jun. 14, 1983

Related U.S. Application Data

[62] Division of Ser. No. 282,970, Jul. 13, 1981, Pat. No. 4,387,878.

[51] Int. Cl.³ .................. F16K 31/04; F16K 31/40
[52] U.S. Cl. .................. 251/30.03; 92/98 D; 251/38; 251/45
[58] Field of Search ............ 137/316; 92/98 D, 99 R; 251/30, 38, 45, 46

[56] References Cited

U.S. PATENT DOCUMENTS

| | | | |
|---|---|---|---|
| 2,936,780 | 5/1960 | Pratt | 251/30 |
| 3,136,229 | 6/1964 | Bauman | 92/99 R |
| 3,333,602 | 8/1967 | Erickson | 137/614.11 |
| 3,352,209 | 11/1967 | Cripe | 92/99 R |
| 3,358,566 | 12/1967 | Palmer | 92/99 R |
| 3,483,800 | 12/1969 | Golden | 92/99 R |
| 3,483,823 | 12/1969 | Palmer | 92/99 R |
| 3,593,957 | 7/1971 | Dolter et al. | 251/30 |
| 3,672,627 | 6/1972 | McCarthy et al. | 251/30 |
| 4,174,824 | 11/1979 | Kolze | 251/30 |

FOREIGN PATENT DOCUMENTS 1151701  12/1976  Fed. Rep. of Germany ........ 251/30

Primary Examiner—George L. Walton
Attorney, Agent, or Firm—Fay, Sharpe, Fagan, Minnich & McKee

[57] ABSTRACT

The pilot operated valve assembly includes a flexible diaphragm (A) which selectively engages a valve seat (B) to open and close a fluid passage through the valve. The diaphragm has a plurality of filtering apertures 20 and an inward peripheral attaching projectio 80. A diaphragm insert (C) is frictionally received in the diaphragm. The diaphragm insert has a pilot supply aperture 74 in fluid communication with a peripheral recess 76 extending inward from a peripheral edge. The diaphragm filtering apertures 20 are disposed in fluid communication with the peripheral recess 76 and the pilot supply aperture 74. The insert peripheral edge has a peripheral valley 82 for receiving the peripheral projection 80 of the diaphragm. The insert has a pilot outlet aperture 66 which is selectively opened and closed by an armature assembly (D). A guide shell (E) aligns the armature assembly (D) with the pilot outlet aperture 66 and defines a pilot reservoir with the diaphragm (A).

11 Claims, 2 Drawing Figures

PILOT OPERATED VALVE ASSEMBLY

This is a division of application Ser. No. 282,970, filed July 13, 1981 now U.S. Pat. No. 4,387,878.

BACKGROUND OF THE INVENTION

This application relates to the art of fluid pressure operated pilot control valves. The invention is particularly applicable to fluid control valves for appliances and will be described with particular reference thereto. It will be appreciated, however, that the invention has other applications in other areas where fluid flows are controlled.

Heretofore, pilot operated fluid valves have generally included a diaphragm assembly including a diaphragm connected with a diaphragm insert. Incoming fluid was received in a fluid inlet cavity to one side of the diaphragm and surrounding a valve seat. Fluid was discharged through a fluid outlet surrounded by the valve seat. A pilot reservoir was disposed on the other side of the diaphragm and insert from the inlet cavity connected with it by a pilot supply aperture and with the outlet by a pilot outlet aperture. A solenoid controlled, spring biased armature selectively opened and closed the pilot outlet aperture. When the pilot outlet aperture was opened, fluid flowed freely from the pilot reservoir allowing pressure in the fluid inlet cavity to lift the diaphragm from the valve seat. When the pilot outlet aperture was closed, fluid flowed into the pilot reservoir through the pilot supply aperture equalizing pressure on either side of the diaphragm allowing the armature bias spring, the diaphragm spring force, and the pressure differential across the valve seat to move the diaphragm against the valve seat.

In the past, the diaphragm had been integrally molded around the diaphragm insert. Such a molding operation required that the pilot supply apertures be relatively large. One problem with large pilot supply apertures was that suspended particles passed through them into the pilot reservoir where they caused the armature to hang up. Another problem with large pilot supply apertures was that they allowed fluid to pass into the pilot reservoir so fast that the valve closed very quickly causing high water hammer pressures. A further problem with large pilot supply apertures is that the pilot outlet aperture must be sized in relation to the pilot supply aperture. Specifically, the pressure force which must be overcome by the solenoid coil equals the area of the pilot outlet aperture times the maximum valve pressure differential. The pressure force must also be supported by the resilient seal without significant compression set because the seal may take radial excersions and will not always seal in the same place. Consequently, a larger pilot outlet aperture requires a larger annular support area to prevent compression set. The spring force must be proportional to the annular support area and, consequently, a higher spring force is needed. A correspondingly large and expensive solenoid coil was needed to move the armature against the sping force plus the pressure force.

One solution, which is illustrated in U.S. Pat. No. 3,593,957, issued July 20, 1971 to P. A. Dolter et al. and assigned to the assignee herein, was to replace the one piece molded diaphragm insert-diaphragm assembly with a separate plastic insert and diaphragm. In this arrangement, a single relatively small pilot supply aperture through the insert connected with a plurality of filtering apertures in the diaphragm. The applicant herein has found that one problem with the two-piece diaphragm insert-diaphragm assembly is that fluid flowing through the relatively large cross-sectional area of filtering apertures tends to bypass the insert pilot supply aperture by separating the diaphragm from the insert. This allows fluid to pass into the pilot reservoir so fast that the armature fails to remain seated against the pilot outlet aperture.

When the diaphragm and insert move toward the valve seat faster than the armature, the pilot outlet aperture is opened allowing the fluid pressure in the inlet cavity to lift the diaphragm away from the valve seat. Because the solenoid remains unactuated, the armature, after bouncing off the insert, again closes the pilot outlet aperture. The diaphragm and insert again move toward the valve seat faster than the armature which again opens the pilot valve outlet. This process is known as "chatter". The chatter continues until the energy is absorbed or damped out which may be an extended period of time. During the chatter, unwanted fluids continue to flow through the valve and out the fluid outlet. Various conditions tend to increase the tendency for chatter or the time to damp it out. These include the accumulation of air or gas in the pilot reservoir, connecting the valve with rigid plumbing, constructing the diaphragm of higher modulus rubber, utilizing a weaker solenoid and armature bias spring, and the like.

Another problem with the two-piece diaphragm insert and diaphragm assembly of the Dolter patent is that the diaphragm insert is relatively difficult and complex to mold. The diaphragm insert has an annular recess in its lower face for connecting the diaphragm filtering apertures with the pilot supply aperture and an annular recess around its valve seat aligning portion for anchoring the diaphragm. Because these two annular recesses extend in directions perpendicular to each other adjacent the same side of the insert, complex and multiple-piece die structures are required in order for the molded insert to be releasable from the mold. Such complex die structures are expensive to construct and difficult and time consuming to use.

SUMMARY OF THE INVENTION

The present invention overcomes the above referenced problems and others yet provides a pilot operated valve assembly which is inexpensive to manufacture yet highly reliable.

In accordance with the first aspect of the invention, there is provided a diaphragm assembly for pilot operated valves which comprises a diaphragm insert, a flexible diaphragm, and an attaching means for attaching a diaphragm peripheral portion with the insert. The diaphragm insert has a first side, a second side, and a peripheral edge. A pilot outlet aperture and a pilot supply aperture extend between the first and second sides of the insert. The flexible diaphragm has a first diaphragm portion disposed adjacent the insert second side, the diaphragm peripheral portion disposed adjacent the insert peripheral edge, and a web portion extending from the diaphragm peripheral portion to an annular seating portion. The diaphragm has at least one aperture in fluid communication with the pilot supply aperture.

In accordance with another aspect of the invention, there is provided a diaphragm assembly for a pilot operated valve comprising a diaphragm insert and a flexible diaphragm. The diaphragm insert has a first side, a second side, and a peripheral edge. A pilot outlet aperture and a pilot supply aperture extend through the insert between the first and second sides. A peripheral recess which extends inward from the insert peripheral edge is in fluid communication with the pilot supply aperture. The diaphragm has a first portion disposed adjacent the insert second side, a peripheral portion disposed adjacent the insert peripheral edge, and a web portion extending between the diaphragm peripheral portion and an annular sealing portion. A plurality of filtering openings extend through the diaphragm in fluid communication with the insert peripheral recess.

One advantage of the first aspect of the invention is that the valve is more reliable and chatter is eliminated.

Another advantage of the first aspect of the present invention is that it allows the diaphragm to be made with relatively high modulus materials.

One advantage of the second aspect of the invention is that it simplifies the molding operation of the diaphragm insert and allows less complex molds to be used.

Still further advantages of the present invention will be apparent to others upon reading and understanding the following detailed description of the preferred embodiment.

BRIEF DESCRIPTION OF THE DRAWINGS

The invention may take form in various parts and arrangements of parts. The figures are only for purposes of illustrating a preferred embodiment of the invention and are not to be construed as limiting the invention.

DETAILED DESCRIPTION OF THE PREFERRED EMBODIMENT

Figure 1:
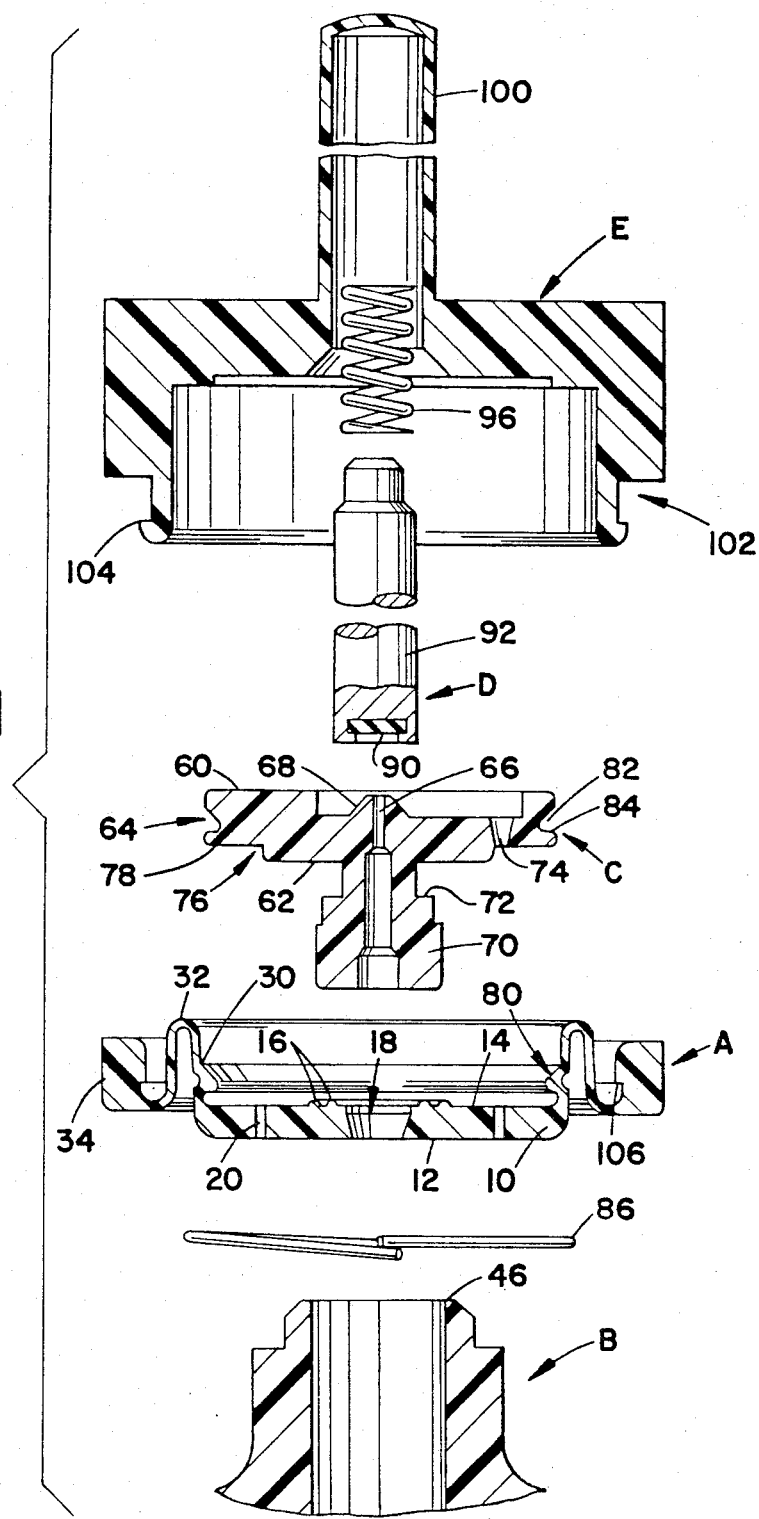
FIG. 1 is an exploded view of a pilot operated valve subassembly including a diaphragm insert and diaphragm assembly in accordance with the present invention.

With particular reference to FIG. 1, a pilot operated valve assembly includes a flexible diaphragm A for selectively opening and closing a fluid flow path through a valve seat B. The diaphragm is connected with a diaphragm insert C which provides rigidity and substance to the diaphragm. The diaphragm insert C and a solenoid armature assembly D provide a pilot valve for controlling the movement of the diaphragm A relative to the valve seat B. A guide shell E frictionally engages the diaphragm A to define a pilot reservoir opposite the valve seat and slidingly guides the armature assembly D.

Figure 2:
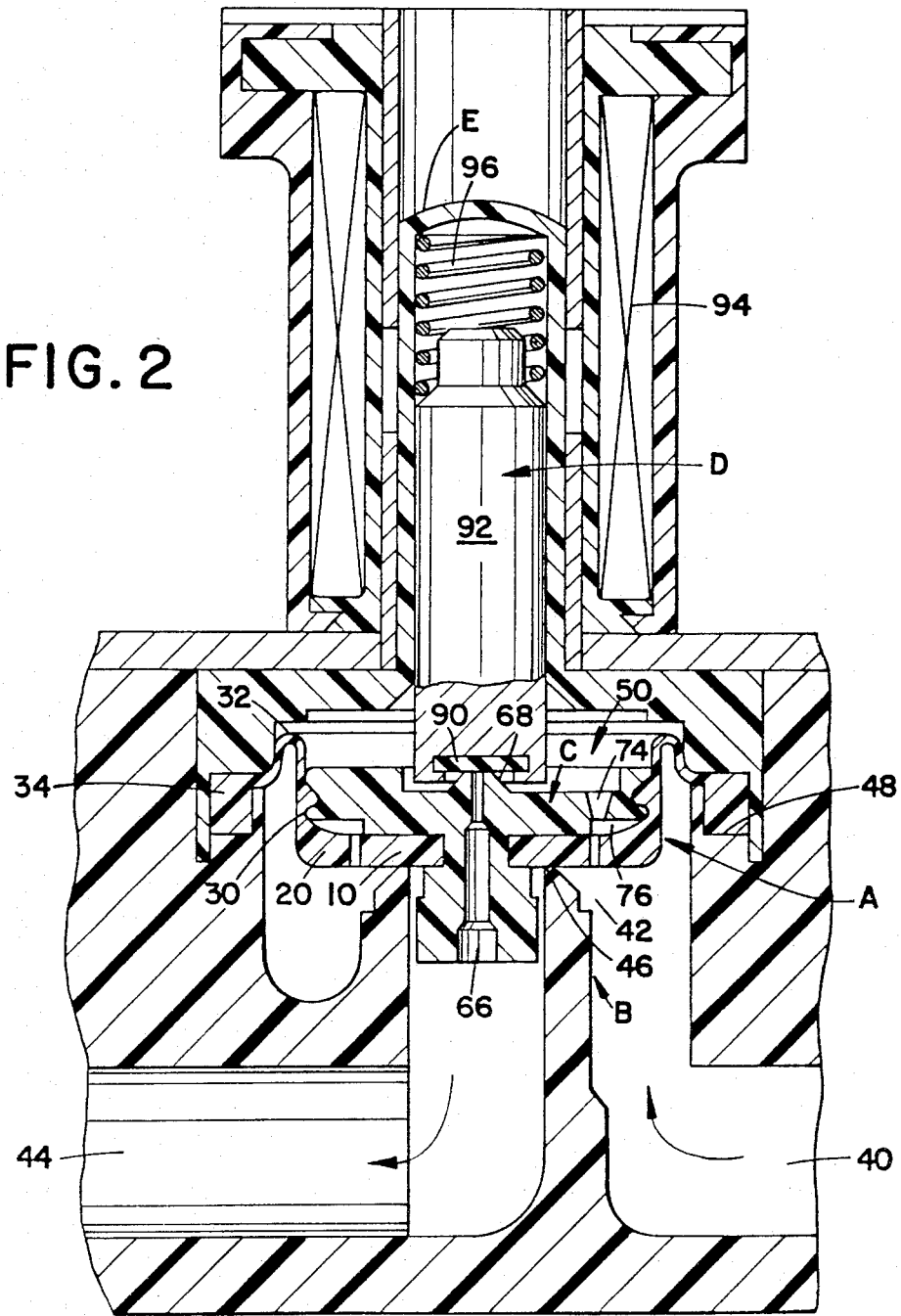
FIG. 2 is a side sectional elevational view of a pilot operated valve in accordance with the present invention.

With primary reference to FIG. 1 and secondary reference to FIG. 2, the diaphragm A includes a generally planar first portion 10 which selectively engages the valve seat B on a diaphragm second side 12 and engages the diaphragm insert on a diaphragm first side 14. A pair of sealing beads 16 which surround a central diaphragm aperture 18 engage the diaphragm insert to improve the sealing relationship therewith. A plurality of filtering apertures 20 are disposed in a circumferential ring in the first diaphragm portion 10. The filtering apertures are of a sufficiently small diameter that they filter or block suspended particulates which would tend to interfere with smooth operation of the armature assembly, block the pilot supply aperture, or accumulate in the pilot outlet aperture. Such interference with the armature assembly or blockage of the pilot supply aperture is apt to cause the valve to stay open resulting in flooding or overflowing of the associated appliance.

Molded generally orthogonally to the first diaphragm portion 10 is a generally cylindrical peripheral diaphragm portion 30. A rolling web portion 32 connects the peripheral portion 30 with an annular seating portion 34. The annular seating portion 34 frictionally engages the guide shell E to retain the diaphragm, diaphragm insert, and armature within guide shell E to provide an easily handled subassembly. The diaphragm web 32 rolls to allow the first diaphragm portion 10 to move toward and away from the valve seat B with controlled stretching of the diaphragm material and with relatively little force.

With primary reference to FIG. 2 and continued reference to FIG. 1, the valve seat B is an integral part of a valve housing. The valve housing defines a fluid inlet 40 in fluid communication with an annular inlet cavity 42 adjacent the diaphragm second side 12 and surrounding the valve seat B and a fluid outlet 44 surrounded by the valve seat. The valve set terminates in an annular sealing edge 46 which contacts the first portion 10 of the diaphragm to separate the inlet and outlet blocking the flow of fluid. The valve housing further includes an annular seating ledge 48 for frictionally engaging the annular seating portion 34 of the diaphragm and the guide shell E to lock them into a fixed fluid sealing relationship with the housing. The sealing relationship defines a pilot reservoir 50 between the diaphragm A and the guide shell E.

With primary reference to FIG. 1 and continued reference to FIG. 2, the diaphragm insert C has a first side 60 disposed toward the pilot reservoir 50, a second side 62 disposed toward the diaphragm first portion 10, and a peripheral edge 64 extending peripherally around the insert between the first and second sides. Centrally disposed in the diaphragm insert C is a pilot outlet aperture 66 extending between the first and second diaphragm insert sides. Surrounding the pilot outlet aperture 66 on the first side 60 is a pilot valve seat 68 and surrounding the pilot aperture 66 on the second side is an aligning portion 70. The aligning portion 70 is received in the valve seat B to maintain the diaphragm and diaphragm insert in accurate alignment with the valve seat. The aligning portion 70 has a frictional anchoring portion for anchoring the first diaphragm portion 10 in frictional engagement with the diaphragm insert second side 62. The anchoring means includes a shoulder 72 on the aligning portion 70 which is spaced from the insert second side 62 by a distance less than the thickness of the diaphragm first portion 10 adjacent its central opening 18. This allows the diaphragm to be snapped over the aligning portion and have its central region firmly anchored between the aligning portion and the insert second side. A pilot supply aperture 74 extends between the first and second sides of the insert. The pilot supply aperture 74 controls the rate at which fluid can flow from the inlet cavity 42 into the pilot reservoir 50. In the preferred embodiment, the pilot outlet aperture 66 is larger in cross section than the pilot supply aperture 74 to allow fluid to be drained from the pilot reservoir 50 more quickly than it is resupplied. A peripheral recess 76 in the peripheral edge 64 extends around the insert and in fluid communication with the pilot supply aperture 74. The peripheral recess 76 has a first side 78 which extends at an orthogonal or oblique angle to the peripheral edge, preferably parallel to the insert second side. This permits the lower portion of the diaphragm insert to be molded with a pair of mold block halves which move radially outward from the pilot outlet aperture 66 after the molding operation is completed.

Attaching means are provided for attaching the diaphragm peripheral portion with the diaphragm insert with sufficient security that fluids received in the peripheral recess 76 under the pressures normally associated with valve operation are unable to pass between the insert peripheral edge 64 and the diaphragm peripheral portion 30. In the preferred embodiment, the attaching means includes an inward annular projection 80 extending inward from the diaphragm peripheral portion 30 for engaging the insert peripheral edge 64 or the insert first side 60. Again to the preferred embodiment, the insert peripheral edge 64 includes an peripheral valley 82 for receiving the annular projection 80 of the diaphragm. The peripheral valley has a wall portion 84 which is substantially orthogonal to the insert peripheral edge to provide a strong barrier to fluids seeking to move between the diaphragm and the insert. Alternately, the annular projection may be disposed on the diaphragm insert peripheral wall and the peripheral valley on the diaphragm peripheral portion. As another alternative, an annular retaining ring 86 may be disposed around the exterior of the diaphragm peripheral portion 30 to increase the frictional engagement with the insert peripheral edge 64. Other alternatives for increasing the frictional engagement include heat stakes, other undercuts, adhesives, solvent welds, or the like.

The armature assembly D includes a movable pilot valve member or resilient seal 90 which is connected with ferromagnetic element 92. The ferromagnetic element 92 is adapted to be selectively pulled by a solenoid coil 94 against a biasing spring 96. The biasing spring 96 biases the movable pilot valve member towards the pilot valve seat 68 such that the valve remains closed except under a positive electrical excitation.

The guide shell E is a fluid tight nonmagnetic structure such that fluids remain trapped in the pilot reservoir 50 regardless of the orientation of the valve. The guide shell includes an armature guide sleeve 100 for guiding the motion of the armature 92 along a linear path in alignment with the pilot valve seat 68. The guide shell has an engaging portion 102 for frictionally receiving the annular seating portion 34 of the diaphragm and for engaging the valve body ledge 48 in fluid tight relationship. In the embodiment of FIG. 1, the engaging portion 102 includes an outward extending annular lip 104 which provides positive mating engagement with a corresponding inward extending annular recess 106 in the diaphragm seating portion. The diaphragm A, diaphragm insert C, armature assembly D, and the guide shell E are constructed as a subassembly for incorporation into various types of valves. This positive mating engagement enables the subassembly to be shipped and handled without disassembling.

With particular reference to FIG. 2, absent an excitation electrical potential being applied to the solenoid coil 94, the valve assumes its flow blocking position illustrated in FIG. 2. In this position, the fluid passage through filtering apertures 20, peripheral recess 76, and the pilot supply aperture 74 has allowed the pilot reservoir 50 and the fluid inlet cavity 42 to come into pressure equilibrium. When a pressure equilibrium is established on both sides of the diaphragm web and insert assembly beyond the sealed seat area, only a very small biasing force applied by spring 96 and the diaphragm spring force is necessary to retain the valve secure in its closed position at low pressure. As the pressure differential across the valve seat increases, additional sealing pressure is provided which varies with the product of the pressure and the area of the seat. Optionally to inhibit the resilient diaphragm material from taking a compression set, the seat 46 may be contoured to present an increased annular area with increases in pressure. To open the valve, an excitation potential is applied to the coil 94 lifting the armature 92 against the spring 96. This opens the pilot outlet aperture 66 allowing the fluid within the pilot reservoir 50 to drain to the fluid outlet 44. Because the pilot outlet aperture 66 allows a higher flow than the pilot supply aperture 74, fluid from the pilot reservoir 50 drains more rapidly than it is replaced lowering the pressure within the pilot reservoir 50. Under the influence of this pressure differential, the fluid inlet pressure acting on the second side of the diaphragm lifts the diaphragm and diaphragm insert assembly away from the valve seat. This opens the valve allowing a fluid flow between the fluid inlet 40 and fluid outlet 44. To close the valve, the excitation potential is removed from coil 94 such that biasing spring 96 urges the pilot valving means 90 against the pilot valve seat 68 closing the pilot outlet aperture. Fluid from the fluid inlet cavity 42 passes through the filtering apertures 20, the peripheral recess 76, and the pilot supply aperture 74 which tends to equalize the pressure between the fluid inlet cavity 42 and the pilot reservoir 50. This balancing of the fluid pressure on either side of the diaphragm and diaphragm insert assembly allows the relatively small spring 96 and diaphragm spring force to close the valve.

The invention has been described with reference to the preferred embodiment. Clearly modifications and alterations will occur to others upon reading and understanding the preceding description of the preferred embodiment. It is intended that the invention include all such modifications and alterations which come within the scope of the appended claims or the equivalents thereof.

Having thus described the preferred embodiment of the invention, the invention is now claimed to be:

1. A pilot-operated valve having a relatively simply molded plastic diaphragm insert, the pilot-operated valve comprising:
  (a) a valve housing which defines a fluid inlet in fluid communication with an annular inlet cavity, a valve seat generally central in the annular inlet cavity, and a fluid outlet extending through the valve seat;
  (b) a flexible diaphragm having an annular seating portion disposed in a fluid sealing relationship with the valve housing surrounding the annular inlet cavity, a flexible web portion extending peripherally inward from the annular seating portion for permitting movement of the diaphragm relative to the valve housing, a diaphragm peripheral portion disposed peripherally inward from the web portion for mechanically engaging the diaphragm insert, and a diaphragm central portion disposed radially inward from the diaphragm peripheral portion, the diaphragm central portion (i) having a first side which is disposed for selectively contacting the valve seat to form a sealing relationship therewith, (ii) defining a plurality of filtering apertures therethrough adjacent the diaphragm peripheral portion in fluid communication with the annular inlet cavity, and (iii) defining a central aperture therethrough in fluid communication with the fluid outlet;

(c) the diaphragm insert having a first side, an oppositely disposed second side which is disposed adjacent the diaphragm central portion, and a peripheral edge disposed peripherally around the diaphragm insert between the first and second sides and in firm frictional contact with said diaphragm peripheral portion, the insert defining:

(i) a pilot outlet aperture centrally therethrough in communication with the diaphragm central aperture and the valve outlet, (ii) a peripheral recess extending inward from both the insert peripheral edge and the insert second side such that the peripheral recess is moldable by a radially inward projection of a split mold block which is adapted to move generally parallel with the first and second insert sides, the insert peripheral recess being disposed in alignment and fluid communication with the diaphragm filtering apertures for conveying filtered fluid therefrom, (iii) a pilot supply aperture extending therethrough between the first side and the peripheral recess such that the peripheral recess is in fluid communication with both the pilot inlet aperture and the diaphragm filter apertures, whereby the peripheral recess provides fluid communication between the filter apertures and the pilot aperture without complex, multipiece molding arrangements;

(d) means operatively connected with the diaphragm annular seating portion for defining a pilot reservoir in fluid communication with the pilot inlet and outlet apertures; and, (e) pilot valve means operatively connected with the pilot outlet aperture for selectively opening and closing the pilot outlet aperture.

2. The pilot-operated valve as set forth in claim 1 wherein the insert peripheral recess has a recess wall portion extending from the peripheral edge which is generally parallel to the insert second side.

3. The pilot-operated valve as set forth in claim 2 wherein the insert peripheral recess and the diaphragm define an annular fluid cavity having a generally triangular cross section.

4. The pilot-operated valve as set forth in claim 1 wherein the insert peripheral edge and the diaphragm peripheral portion have a mating projection and valley for securely attaching the diaphragm and insert together.

5. The pilot-operated valve as set forth in claim 4 wherein the insert has the valley and the diaphragm has the projection.

6. The pilot-operated valve as set forth in claim 5 wherein the insert valley has a wall portion adjacent the insert peripheral recess which is generally parallel to the insert second side.

7. A diaphragm assembly for a pilot-operated valve comprising:
a diaphragm insert having a first side, a second side, and a peripheral edge between the first and second sides, the insert defines a pilot outlet aperture and a pilot supply aperture extending between the first and second sides; a flexible diaphragm including:

(i) a central diaphragm portion having a diaphragm first side disposed adjacent the insert and a diaphragm second side which is adapted for engaging a valve seat, the diaphragm central portion being connected to the insert adjacent the pilot outlet aperture with a fluid-tight seal, (ii) a diaphragm peripheral portion which frictionally engages the insert peripheral edge, (iii) an annular seating portion disposed outward from the peripheral portion for sealingly engaging an associated structure, (iv) the diaphragm defining at least one aperture therethrough in fluid communication with the pilot supply aperture; and, mechanical attaching means for securely attaching the diaphragm peripheral portion to the insert only at its peripheral edge, the attaching means being disposed in its entirely radially outward of the pilot supply aperture to form a substantially fluid-tight seal therebetween to seal against fluid flowing through the diaphragm aperture and between the diaphragm and the insert bypassing the insert pilot supply aperture.

8. The diaphragm assembly as set forth in claim 7 wherein the attaching means includes a projection disposed on one of the diaphragm peripheral portion and the insert peripheral edge for frictionally engaging the other.

9. The diaphragm assembly as set forth in claim 7 wherein the attaching means includes an inward peripheral projection extending inward from the diaphragm peripheral portion for engaging at least one of the insert first side and the insert peripheral edge.

10. The diaphragm assembly as set forth in claim 9 wherein the diaphragm peripheral projection engages a peripheral valley in the insert peripheral edge.

11. A diaphragm assembly for a pilot-operated valve comprising:

(a) a diaphragm insert having a first side, a second side, and a peripheral edge between the first and second sides, the insert defining a pilot outlet aperture and a pilot supply aperture extending between the first and second sides;

(b) a flexible diaphragm including:

(i) a central diaphragm portion having a diaphragm first side disposed adjacent the insert and a diaphragm second side which is adapted for engaging a valve seat, the diaphragm central portion being connected to the insert adjacent the pilot outlet aperture with a fluid-tight seal, (ii) a diaphragm peripheral portion which engages the insert adjacent peripheral edge thereof, (iii) an annular seating portion disposed outward from the peripheral portion for sealingly engaging an associated structure, (iv) the diaphragm defining at least one aperture therethrough in fluid communication with the pilot supply aperture; and, (c) mechanical attaching means for securely attaching the diaphragm peripheral portion to the insert only at its peripheral edge, the attaching means being disposed in its entirety radially outward of the pilot supply aperture, the attaching means including:

(i) at least one peripherally extending projection disposed along one of the insert peripheral edge and the diaphragm peripheral portion at least adjacent the pilot supply aperture, and (ii) a peripheral valley in the other of the diaphragm peripheral portion and the insert peripheral edge for receiving the at least one projection frictionally therein with a fluid-tight seal between the at least one projection and the peripheral valley, whereby fluid flowing through the diaphragm aperture is substantially channeled through the insert pilot supply aperture.

* * * * *